(12) United States Patent
Humes et al.

(10) Patent No.: US 12,146,415 B2
(45) Date of Patent: Nov. 19, 2024

(54) SYSTEMS AND METHODS FOR MULTI-DIMENSIONAL VARIABLE VANE STAGE RIGGING UTILIZING ADJUSTABLE BRACKET PLATES

(71) Applicant: Rolls-Royce North American Technologies Inc., Indianapolis, IN (US)

(72) Inventors: Ryan Humes, Indianapolis, IN (US); Andrew Eifert, Indianapolis, IN (US); Paulo Bazan, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 51 days.

(21) Appl. No.: 18/091,919

(22) Filed: Dec. 30, 2022

(65) Prior Publication Data
US 2024/0218805 A1    Jul. 4, 2024

(51) Int. Cl.
*F01D 17/16*    (2006.01)
*F02C 9/22*    (2006.01)

(52) U.S. Cl.
CPC .............. *F01D 17/162* (2013.01); *F02C 9/22* (2013.01); *F05D 2220/32* (2013.01);
(Continued)

(58) Field of Classification Search
CPC ........ F01D 17/162; F01D 17/16; F01D 9/041; F01D 9/042; F01D 17/14; F01D 9/04; F01D 17/12; F01D 25/34; F01D 17/165; F01D 25/16; F01D 25/243; F01D 25/28; F01D 7/00; F04D 29/563; F04D 27/0246; F04D 27/002; F04D 29/644; F04D 29/321; F04D 29/323; F05D 2220/32; F05D 2260/56; F05D 2260/50; F05D 2240/12; F05D 2240/128; F05D 2260/53; F05D 2260/74; F05D 2250/90; F05D 2250/14; F05D 2230/64; F05D 2230/60; F05D 2260/36; F05D 2260/532; F05D 2260/60;
(Continued)

(56) References Cited

U.S. PATENT DOCUMENTS 3,914,066 A    10/1975    Downing
4,575,307 A *    3/1986    Shinohara ............... F03B 3/183
                                                        415/164

(Continued)

*Primary Examiner* — Eric J Zamora Alvarez
(74) *Attorney, Agent, or Firm* — Barnes & Thornburg LLP

(57) ABSTRACT

A vane adjustment assembly includes a plurality of vanes, an annular ring coupled to the vanes, and a ring adjustment plate. The adjustment plate includes a main plate portion arranged on the ring and including a first adjustment region defined between two walls and a first elongated opening formed through the first adjustment region, and an adjustment fastener removably arranged in the first adjustment region between the first and second walls and including an adjustment head and a fastening pin eccentrically coupled to the adjustment head and removably coupled to the annular ring. The adjustment fastener can be selectively arranged at rotational positions within the first adjustment region so as to selectively arrange the fastening pin at distinct circumferential positions relative to the first and second walls such that the main plate portion can be positioned at distinct circumferential positions.

20 Claims, 13 Drawing Sheets

(52) U.S. Cl.
CPC ...... *F05D 2230/60* (2013.01); *F05D 2240/12* (2013.01); *F05D 2260/60* (2013.01)

(58) Field of Classification Search
CPC ........... F05D 2260/70; F05D 2250/294; F05B 2260/50; F02C 9/22
See application file for complete search history.

(56) References Cited

U.S. PATENT DOCUMENTS

| | | |
|---|---|---|
| 5,492,446 A | 2/1996 | Hawkins et al. |
| 5,692,879 A | 12/1997 | Charbonnel |
| 5,807,072 A | 9/1998 | Payling |
| 5,993,152 A | 11/1999 | Schilling |
| 6,769,868 B2 | 8/2004 | Harrold |
| 7,413,401 B2 | 8/2008 | Szucs et al. |
| 7,802,964 B2 * | 9/2010 | Bouru ............... F04D 29/563 74/25 |
| 8,297,918 B2 | 10/2012 | Bhatnagar |
| 8,333,546 B2 | 12/2012 | Colotte et al. |
| 8,393,857 B2 | 3/2013 | Copeland et al. |
| 8,727,697 B2 | 5/2014 | Eifert |
| 9,309,897 B2 * | 4/2016 | Hashimoto ........... F04D 29/059 |
| 9,353,643 B2 | 5/2016 | Major |
| 9,645,050 B2 | 5/2017 | Allford |
| 10,100,663 B2 | 10/2018 | Longworth et al. |
| 10,196,925 B2 | 2/2019 | Siebert |
| 10,288,079 B2 | 5/2019 | Skertic |
| 10,301,962 B2 | 5/2019 | Chandler et al. |
| 10,352,187 B2 | 7/2019 | Keenan |
| 10,364,828 B2 | 7/2019 | Ikeguchi et al. |
| 10,393,145 B2 | 8/2019 | Medina Cruz et al. |
| 10,443,431 B2 | 10/2019 | Suciu et al. |
| 10,458,271 B2 | 10/2019 | Chandler et al. |
| 10,508,660 B2 | 12/2019 | Hall et al. |
| 10,626,747 B2 | 4/2020 | Karapurath |
| 10,634,000 B2 | 4/2020 | Skertic et al. |
| 10,662,804 B2 | 5/2020 | Awtry et al. |
| 10,753,231 B2 | 8/2020 | Mena-Dominguez et al. |
| 10,815,802 B2 | 10/2020 | Prasad |
| 10,927,699 B2 | 2/2021 | Bromann et al. |
| 11,105,219 B2 | 8/2021 | Ward |
| 11,125,115 B2 | 9/2021 | Humhauser |
| 11,131,323 B2 | 9/2021 | Suciu et al. |
| 11,371,380 B2 | 6/2022 | Poick |
| 2019/0093502 A1 | 3/2019 | Lyon et al. |
| 2020/0088108 A1 | 3/2020 | Klein et al. |

* cited by examiner

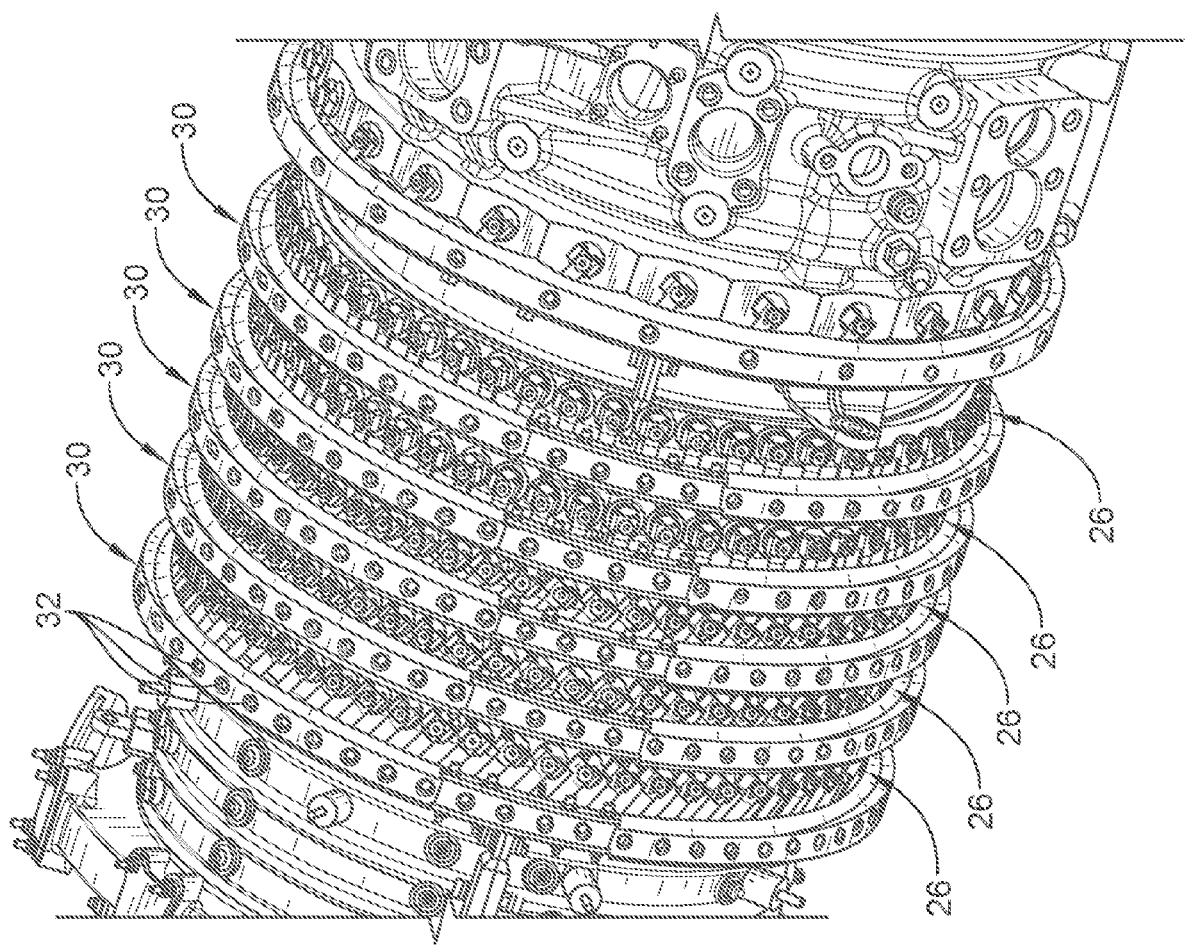

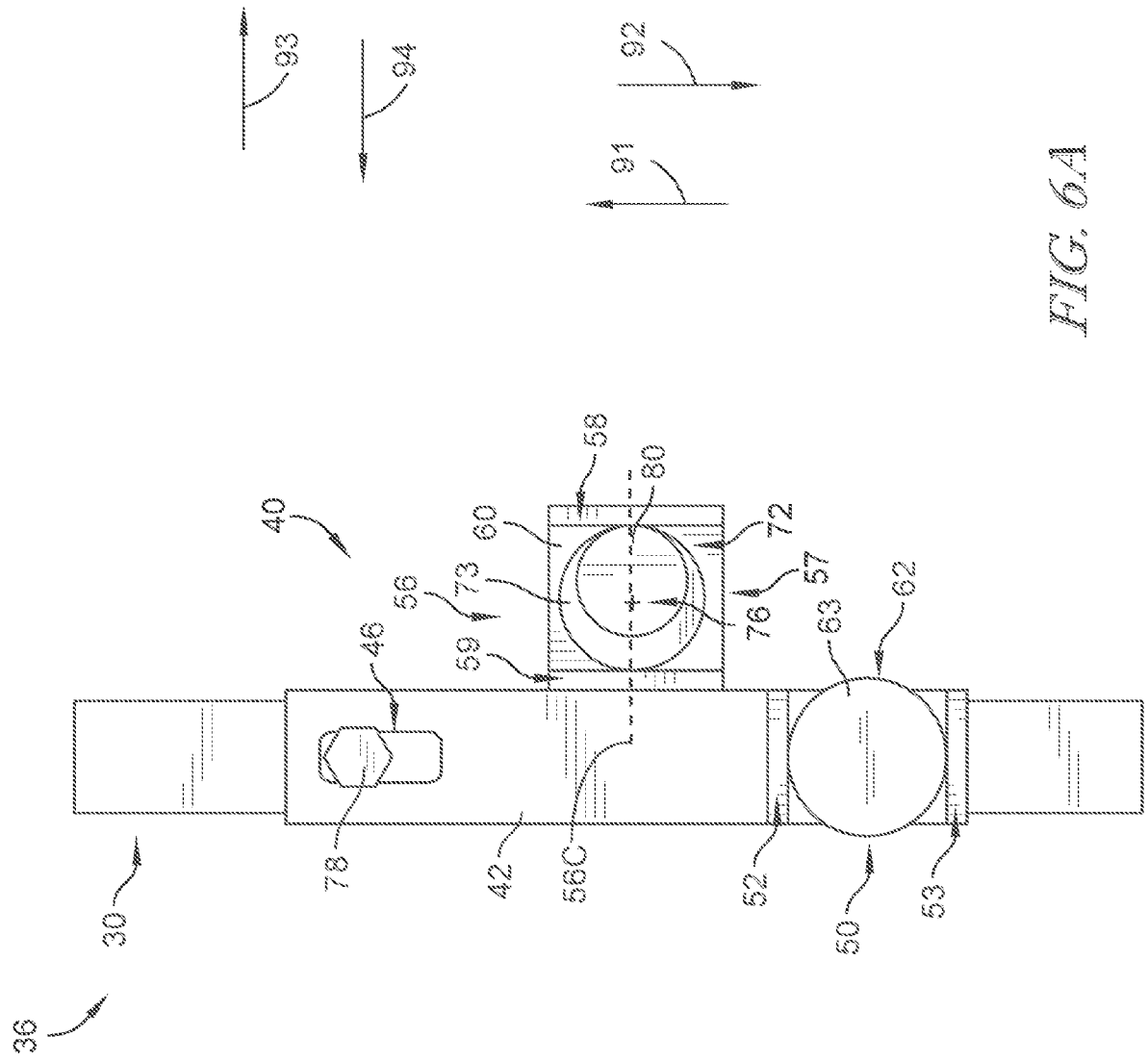

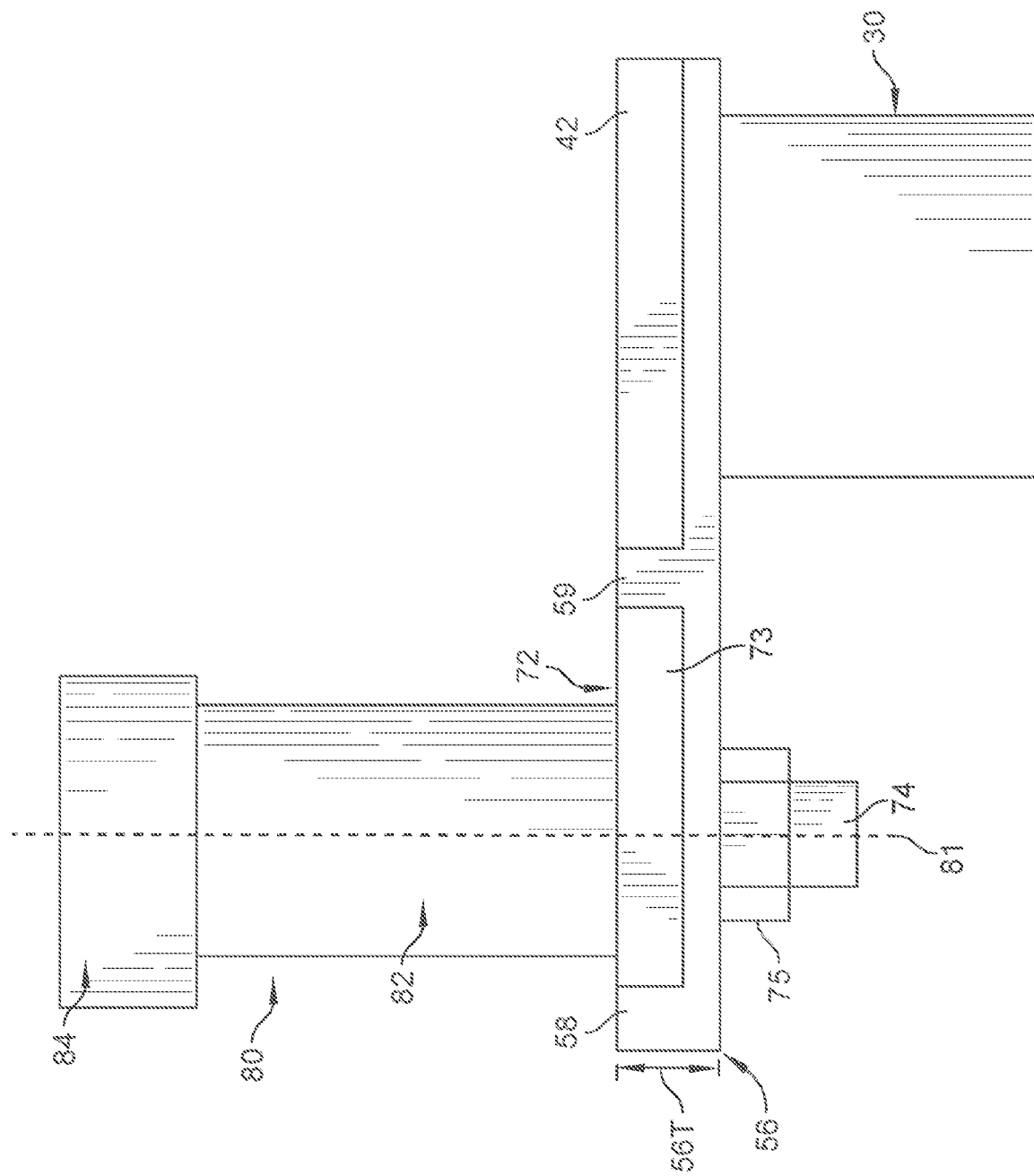

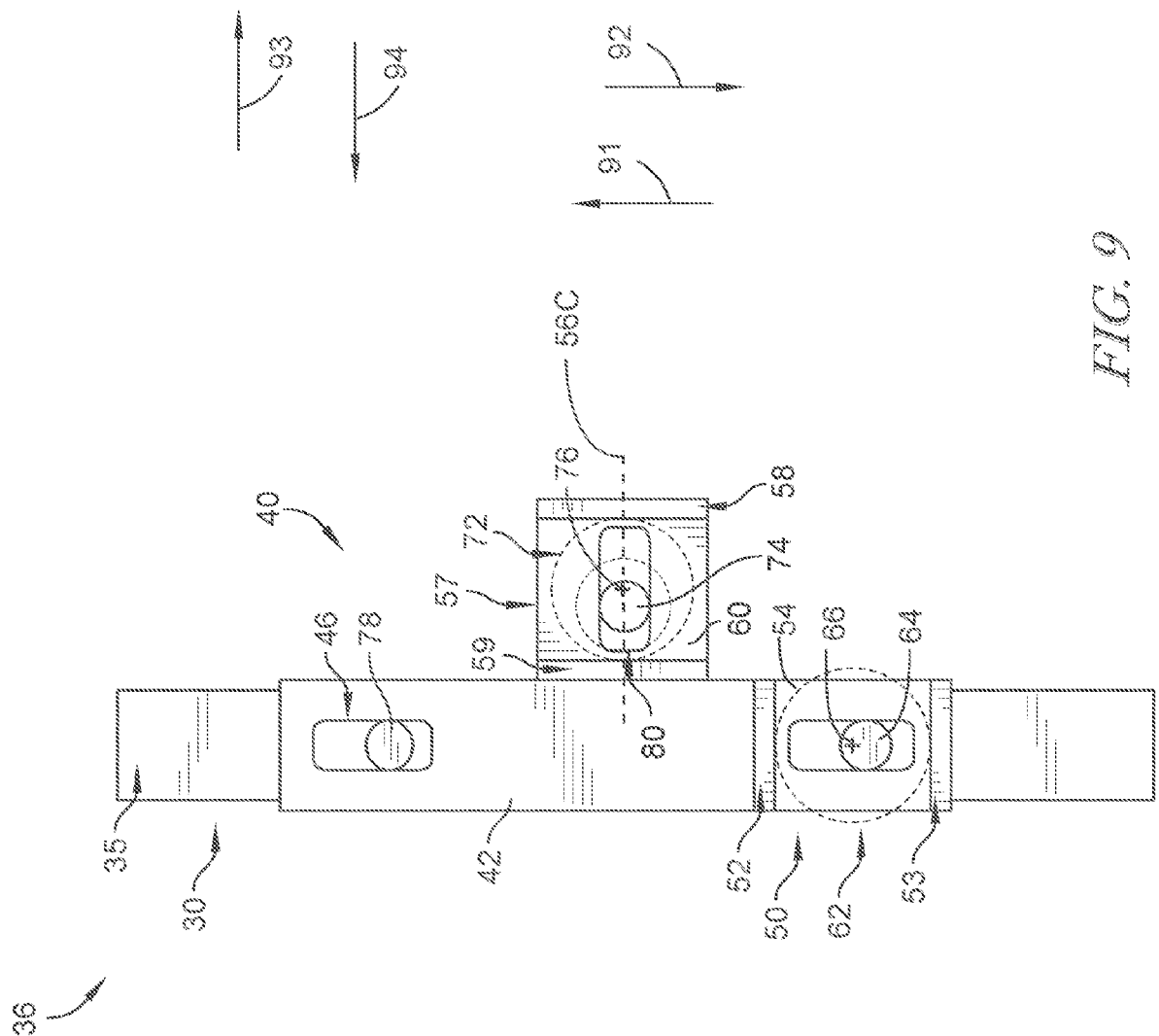

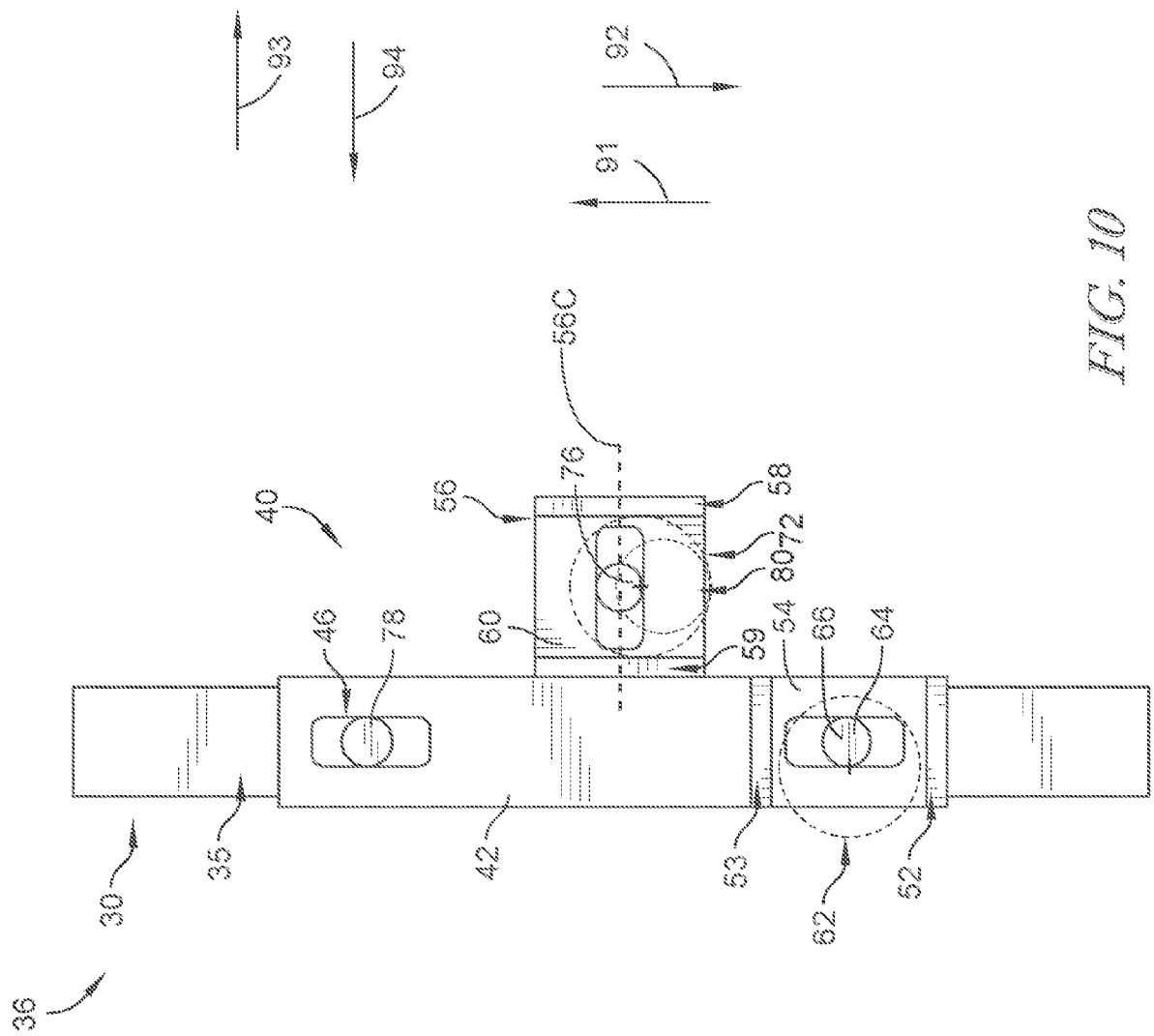

SYSTEMS AND METHODS FOR MULTI-DIMENSIONAL VARIABLE VANE STAGE RIGGING UTILIZING ADJUSTABLE BRACKET PLATES

FIELD OF THE DISCLOSURE

The present disclosure relates generally to gas turbine engines, and more specifically to variable vane assemblies of gas turbine engines.

BACKGROUND

Gas turbine engines are used to power aircraft, watercraft, power generators, and the like. Gas turbine engines typically include an engine core having a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Leftover products of the combustion are exhausted out of the turbine and may provide thrust in some applications.

Gas turbine engines also typically include vane assemblies arranged within the engine components, such as inlet guide vanes and stator vanes. To provide for the necessary stall or surge margin at different power settings throughout operation of the gas turbine engine, variable, or adjustable, vanes may be utilized, such as variable inlet guide vanes and/or variable stator vanes. It is important to position of the vanes with extreme precision in order to accurately direct airflow within the engine.

SUMMARY

The present disclosure may comprise one or more of the following features and combinations thereof.

According to a first aspect of the present disclosure, a vane adjustment assembly for a gas turbine engine includes a plurality of vanes extending radially outward relative to a central axis of the gas turbine engine, an annular ring arranged radially outward of the central axis and coupled to the plurality of variable vanes, and a ring adjustment plate assembly. The ring adjustment plate assembly includes a main plate portion arranged on a radially outer surface of the annular ring and including a first adjustment region defined between a first wall extending radially outwardly away from a radially outer surface the main plate portion and a second wall spaced apart from the first wall and extending radially outwardly away from the radially outer surface the main plate portion, a first elongated opening being formed through the first adjustment region of the main plate portion, and a first adjustment fastener removably arranged in the first adjustment region between the first and second walls and including a first adjustment head that is circular and a first fastening pin eccentrically coupled to the first adjustment head and removably coupled to the annular ring.

In some embodiments, the first adjustment fastener is configured to be selectively arranged at a plurality of rotational positions within the first adjustment region so as to selectively arrange the first fastening pin at a plurality of circumferential positions relative to the first and second walls such that the main plate portion is configured to be positioned at a plurality of distinct circumferential positions each corresponding to a circumferential position of the first fastening pin of the first adjustment fastener.

In some embodiments, the first adjustment head contacts the radially outer surface of the main plate portion in the first adjustment region between the first and second walls, and an outer circumferential surface of the first adjustment head contacts the first and second walls at all rotational positions of the plurality of rotational positions such that each rotational position of the first adjustment head corresponds to at least one distinct circumferential position of the main plate portion.

In some embodiments, the ring adjustment plate assembly further includes an axial plate portion extending axially away from the main plate portion and including a second adjustment region defined between a third wall extending radially outwardly away from a radially outer surface the axial plate portion and a fourth wall spaced apart from the third wall and extending radially outwardly away from the radially outer surface the axial plate portion, a second elongated opening being formed through the second adjustment region of the axial plate portion, a second adjustment fastener removably arranged in the second adjustment region between the third and fourth walls and including a second adjustment head that is circular and a second fastening pin eccentrically coupled to the second adjustment head, and a roller pin fixedly coupled to the second adjustment head.

In some embodiments, the second adjustment fastener is configured to be selectively arranged at a plurality of rotational positions within the second adjustment region so as to selectively arrange the second fastening pin and the roller pin at a plurality of axial positions relative to the third and fourth walls. In some embodiments, the second adjustment head contacts the radially outer surface of the axial plate portion in the second adjustment region between the third and fourth walls, and an outer circumferential surface of the second adjustment head contacts the third and fourth walls at all rotational positions of the plurality of rotational positions such that each rotational position of the second adjustment head corresponds to at least one distinct circumferential position of the roller pin.

In some embodiments, the main plate portion further includes a third elongated opening spaced apart circumferentially from the first elongated opening, and a third fastener pin is removably arranged therethrough and coupled to the annular ring. In some embodiments, the axial plate portion is located generally centrally along a circumferential extent of the main plate portion. In some embodiments, the main plate portion is curved to generally match a curvature of the radially outer surface of the annular ring.

In some embodiments, the first adjustment head is planar, a bottom surface of the first adjustment head contacts the radially outer surface of the main plate portion, and the first fastening pin depends downwardly from the bottom surface of the first adjustment head. In some embodiments, the roller pin is selectively movably coupled to a casing of the gas turbine engine such that movement of the roller pin relative to the casing further adjusts the position of the annular ring relative to the casing, the roller pin is selectively movably coupled to the casing via a cam plate that is slidably coupled to the casing and slidable relative thereto, and the cam plate includes at least one slot within which the roller pin is slidably arranged. In some embodiments, sliding of the cam plate relative to the casing in an axial direction causes the roller pin to slidably move within the at least one slot and further adjust a position of the annular ring relative to the casing, and wherein the roller pin includes a roller pin head configured to be slidably arranged within the at least one slot and engage with edges of the at least one slot.

According to a further aspect of the present disclosure, a vane adjustment assembly for a gas turbine engine includes an annular ring arranged radially outward of a central axis of the gas turbine engine and coupled to a plurality of variable vanes and a ring adjustment plate assembly. The ring adjustment plate assembly includes (i) a main plate portion arranged on the annular ring and including a first adjustment region defined between a first wall and a second wall spaced apart from the first wall, a first elongated opening being formed through the first adjustment region of the main plate portion, and (ii) a first adjustment fastener removably arranged in the first adjustment region and including a first adjustment head that is circular and a first fastening pin eccentrically coupled to the first adjustment head and removably coupled to the annular ring.

In some embodiments, the first adjustment fastener is configured to be selectively arranged at a plurality of rotational positions within the first adjustment region such that the main plate portion is configured to be positioned at a plurality of distinct circumferential positions each corresponding to a circumferential position of the first fastening pin relative to the first and second walls.

In some embodiments, the first adjustment head contacts a radially outer surface of the main plate portion in the first adjustment region between the first and second walls, and an outer circumferential surface of the first adjustment head contacts the first and second walls at all rotational positions of the plurality of rotational positions such that each rotational position of the first adjustment head corresponds to at least one distinct circumferential position of the main plate portion.

In some embodiments, the ring adjustment plate assembly further includes an axial plate portion extending axially away from the main plate portion and including a second adjustment region defined between a third wall and a fourth wall spaced apart from the third wall, a second elongated opening being formed through the second adjustment region of the axial plate portion, a second adjustment fastener removably arranged in the second adjustment region between the third and fourth walls and including a second adjustment head that is circular and a second fastening pin eccentrically coupled to the second adjustment head, and a roller pin fixedly coupled to the second adjustment head.

In some embodiments, the second adjustment fastener is configured to be selectively arranged at a plurality of rotational positions within the second adjustment region so as to selectively arrange the second fastening pin and the roller pin at a plurality of axial positions relative to the third and fourth walls. In some embodiments, the second adjustment head contacts the radially outer surface of the axial plate portion in the second adjustment region between the third and fourth walls, and an outer circumferential surface of the second adjustment head contacts the third and fourth walls at all rotational positions of the plurality of rotational positions such that each rotational position of the second adjustment head corresponds to at least one distinct circumferential position of the roller pin.

In some embodiments, the main plate portion further includes a third elongated opening spaced apart circumferentially from the first elongated opening, and a third fastener pin is removably arranged therethrough and coupled to the annular ring. In some embodiments, the axial plate portion is located generally centrally along a circumferential extent of the main plate portion. In some embodiments, the main plate portion is curved to generally match a curvature of the radially outer surface of the annular ring.

According to a further aspect of the present disclosure, a method of adjusting a position of a plurality of variable vanes of a gas turbine engine includes arranging the plurality of vanes around to a central axis of the gas turbine engine, arranging an annular ring arranged radially outward of the central axis, and coupling the annular ring to the plurality of variable vanes. The method can further include arranging a main plate portion of a ring adjustment plate assembly on a radially outer surface of the annular ring, the main plate portion including a first adjustment region defined between a first wall extending radially outwardly away from a radially outer surface the main plate portion and a second wall spaced apart from the first wall and extending radially outwardly away from the radially outer surface the main plate portion, a first elongated opening being formed through the first adjustment region of the main plate portion, removably arranging a first adjustment fastener in the first adjustment region between the first and second walls, the first adjustment fastener including a first adjustment head that is circular and a first fastening pin eccentrically coupled to the first adjustment head, and removably coupling the first fastening pin of the first adjustment fastener to the annular ring.

In some embodiments, the first adjustment fastener is configured to be selectively arranged at a plurality of rotational positions within the first adjustment region so as to selectively arrange the first fastening pin at a plurality of circumferential positions relative to the first and second walls such that the main plate portion is configured to be positioned at a plurality of distinct circumferential positions each corresponding to a circumferential position of the first fastening pin of the first adjustment fastener.

These and other features of the present disclosure will become more apparent from the following description of the illustrative embodiments.

BRIEF DESCRIPTION OF THE DRAWINGS

FIG. 3A is a perspective view of a compressor section of the engine of FIG. 1, showing that the engine includes multiple annular rings associated with adjacent vane stages of the compressor section, each annular ring being coupled to an associated plurality of vanes of each vane stage so as to control the associated plurality of variable vanes;

FIG. 6A is a top view of the vane adjustment assembly of FIG. 2 showing the first adjustment head arranged between the two walls of the first adjustment region and the second adjustment head with the roller pin coupled thereto arranged between the two walls of the second adjustment region;

FIG. 7 is a side view of the vane adjustment assembly of FIG. 2 showing the roller pin arranged in an axially aft direction;

FIG. 9 is a side view of the vane adjustment assembly of FIG. 2 showing the roller pin and the main plate portion arranged at different axial and circumferential positions than shown in FIG. 2, respectively; and FIG. 10 is a side view of the vane adjustment assembly of FIG. 2 showing the roller pin and the main plate portion located generally centrally relative to the adjustment regions.

DETAILED DESCRIPTION OF THE DRAWINGS

Figure 1:
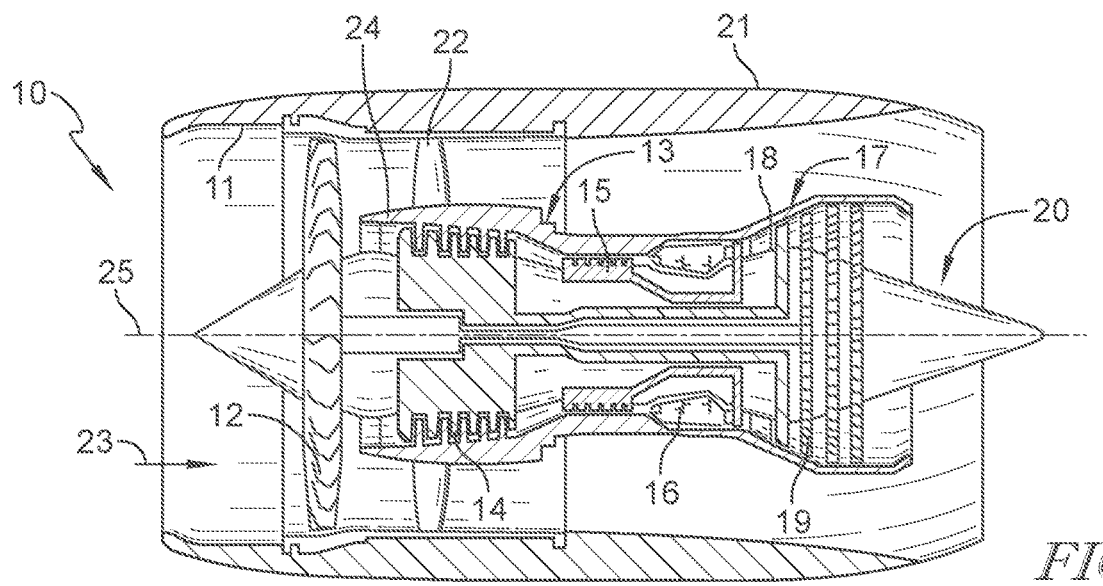
FIG. 1 is a cutaway view of a gas turbine engine with which a vane adjustment assembly according to the present disclosure may be utilized, showing that the gas turbine engine includes a propulsive fan, an engine core including a compressor, a combustor, and a turbine configured to drive the first propulsive fan, and a bypass duct surrounding the engine core.

For the purposes of promoting an understanding of the principles of the disclosure, reference will now be made to a number of illustrative embodiments illustrated in the drawings and specific language will be used to describe the same.

The present disclosure is related to a vane adjustment assembly 36 configured to be utilized in a gas turbine engine 10, in particular a vane adjustment assembly 36 including a ring adjustment plate assembly 40 arranged on an annular ring 30 that is coupled to a plurality of variable vanes 26. The ring adjustment plate assembly 40 includes a main plate portion 42 having a first adjustment region 50 defined between two walls 52, 53 and an axial plate portion 56 having a second adjustment region 57 defined between two walls 58, 59. Each adjustment region 50, 57 has an adjustment fastener 62, 72 arranged thereon, each adjustment fastener 62, 72 including an adjustment head 63, 73 having an eccentrically arranged adjustment pin 64, 74 depending downwardly therefrom and arranged in openings 44, 61 formed in the adjustment regions 50, 57. The adjustment fasteners 62, 72 are configured to be selectively arranged at a plurality of rotational positions so as to selectively arrange the fastening pins 64, 74 at different circumferential positions within the openings 44, 61 such that the main plate portion 42 can be moved to distinct circumferential positions and such that the roller pin 80 can be moved to distinct axial positions. A person skilled in the art will understand that the disclosed vane adjustment assembly 36 or any related vane adjustment assemblies may be utilized in any type of engine similar to a gas turbine engine or any turbomachinery including vanes.

A vane adjustment assembly 36 according to a first aspect of the present disclosure is shown in FIGS. 2 and 4A-10. In an illustrative embodiment, the vane adjustment assembly 36 is configured to be utilized in a turbofan gas turbine engine 10, as shown in FIG. 1. The exemplary gas turbine engine 10 includes an inlet 11, a fan 12, an engine core including a compressor 13 having an inter-stage compressor section 14 and a compressor discharge section 15, a combustor 16, and a turbine 17 having a high-pressure turbine 18 and a low-pressure turbine 19. The fan 12 is driven by the turbine 17 and provides thrust for forwardly propelling an aircraft on which the gas turbine engine 10 is coupled. The compressor 13 compresses and delivers air 23 to the combustor 16. The combustor 16 mixes fuel with the compressed air 23 received from the compressor 13 and ignites the fuel. The hot, high-pressure products of the combustion reaction in the combustor 16 are directed into the turbine 17 to cause the turbine 17 to rotate about an axis 25 of the gas turbine engine 10 and drive the compressor 13 and the fan 12 and exhaust remaining mixture out of the turbine 17 over an exhaust plug 20. The engine 10 may include a nacelle 21 that houses the engine components described above.

The engine 10 includes a casing 24, which may be formed as a single component or multiple cojoined components, that surrounds the various sections of the engine 10, including the compressor 13, the combustor 16, and the turbine 17. Illustratively, the compressor 13 and/or turbine 17 sections may include multiple stages of a plurality of vanes 26 arranged between stages of bladed rotors, as shown in FIG. 3A. In an exemplary embodiment, the compressor section 13 of the engine 10 may include multiple stages, in particular five stages as shown in FIG. 3A, of pluralities of vanes 26, each surrounded by an annular ring 30.

Figure 3B:
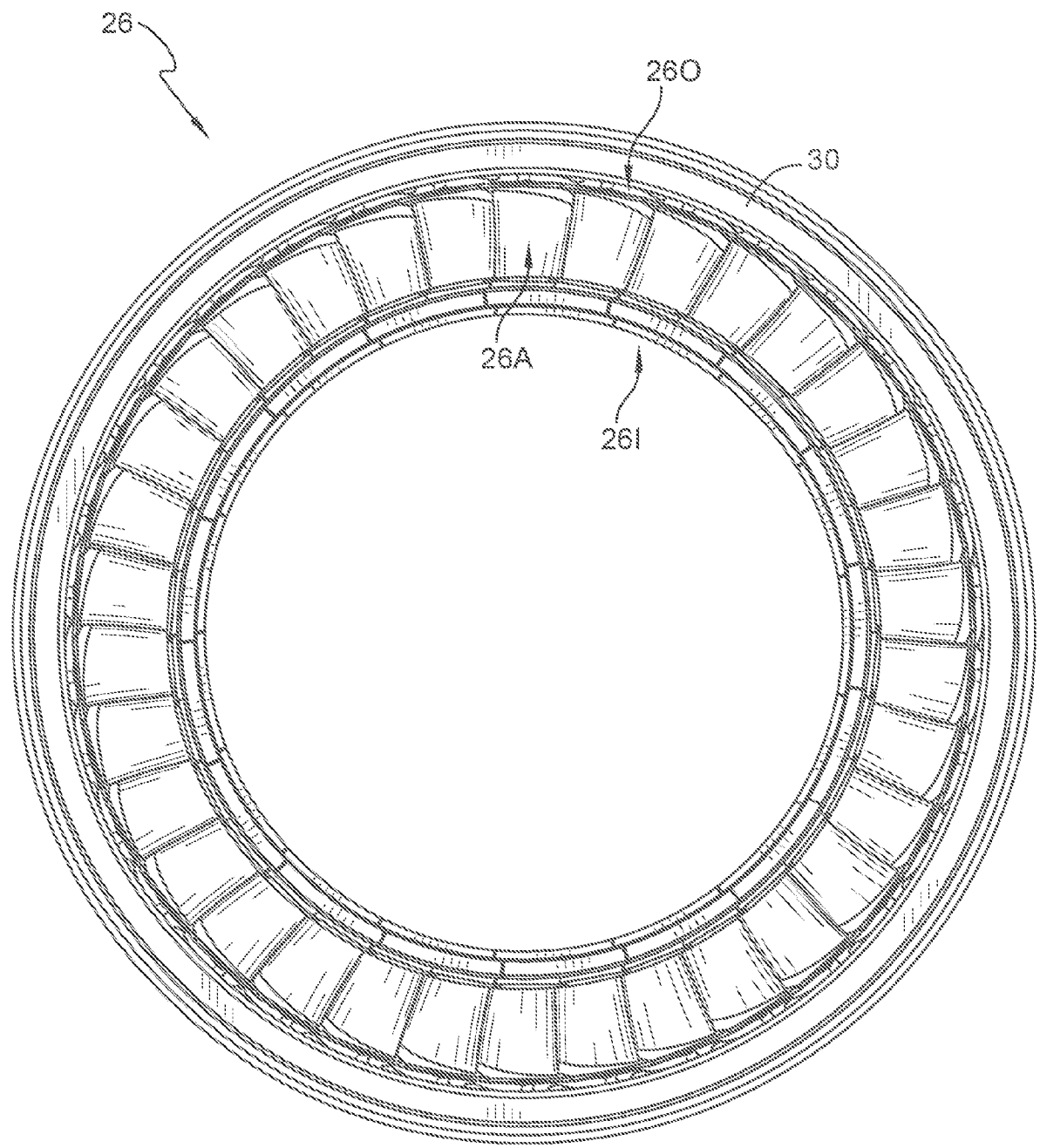
FIG. 3B is a front view of a plurality of vanes of a vane stage of the vane assembly of FIG. 3A.

In some embodiments, the plurality of vanes 26 include individual vane airfoils 26A having inner and outer platforms 261, 260, as shown in FIG. 3B. The plurality of vanes 26 may be surrounded by an annular ring 30. At least some or all of the vanes of the plurality of vanes 26 in some or all of the stages described above may be variable vanes that are configured to rotate so as to selectively redirect incoming air exiting an axially forward bladed rotor and subsequently onto other components of the engine 10.

In the illustrative embodiment, the vane adjustment assembly 36 is configured to be utilized in the compressor or turbine sections 13, 17 of the engine 10, although in other embodiments, a person skilled in the art could envision the adjustment assembly 36, or any other vane assemblies described herein, being utilized in other sections of the engine 10, such as with variable fan outlet guide vanes 22 arranged downstream of the fan 12 or inlet guide vanes arranged upstream of the fan 12.

Figure 3C:
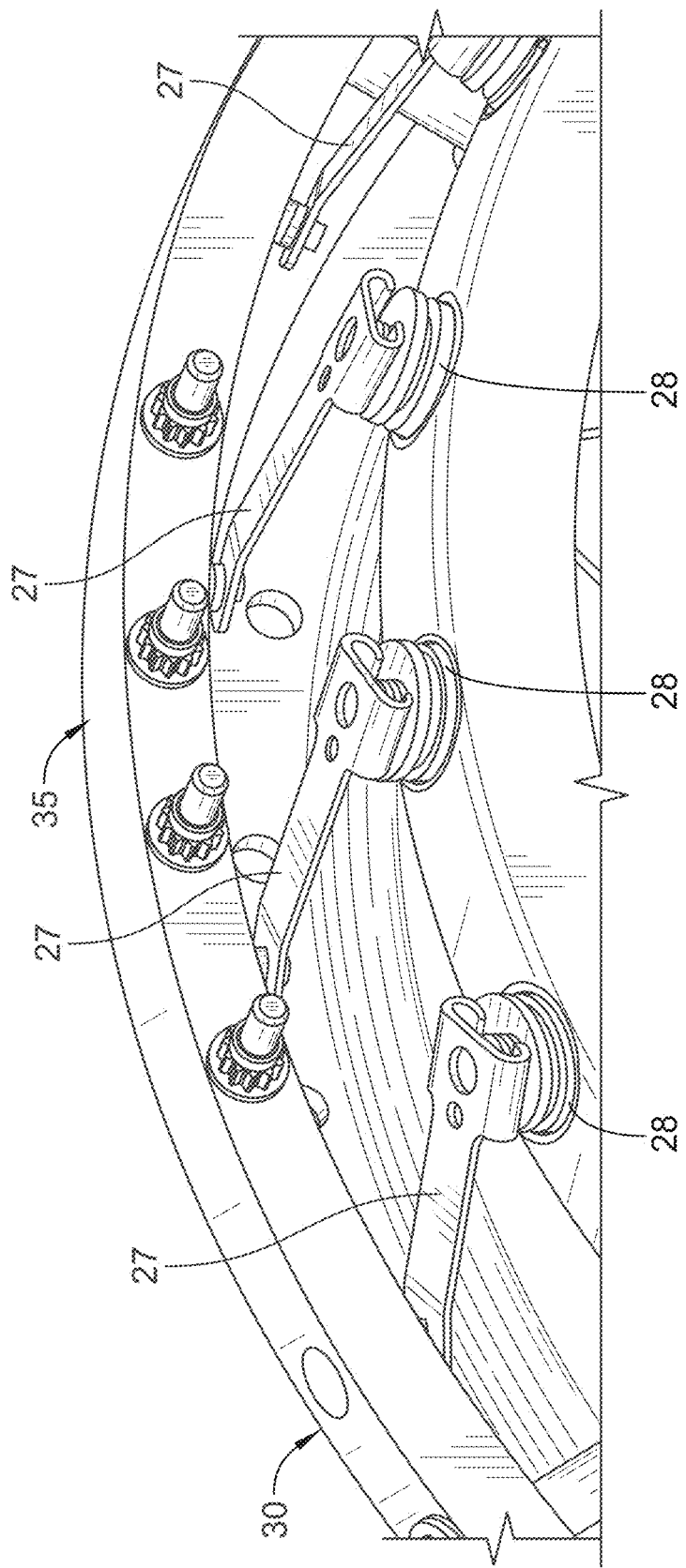
FIG. 3C is a perspective view of the annular ring and plurality of vanes on which the vane adjustment assembly of FIG. 2 is arranged, showing the annular ring coupled to each vane of the plurality of vanes via an actuator lever and a bearing coupled to a radially outer end of the vane.

FIG. 3C shows a perspective view of the annular ring 30, in particular the radially facing surface 35 of the annular ring 30 on which the ring adjustment plate assembly 40 can be arranged. The annular ring 30 can be coupled to each vane of the plurality of vanes 26 via an actuator lever 27 that is rotatably coupled to the annular ring 30 at an attachment hole 32 of the ring 30 and a bearing 28 coupled to a radially outer end of the vane. Movement of the annular ring 30, in particular circumferentially or axially, will affect the positioning of the plurality of vanes 26. In some embodiments, the rings 30 and vanes 26 are moved as the engine power and operating environment changes, such as between take-off, cruise, landing, etc. or between different temperatures, altitudes, pressures, etc.

Illustratively, the annular ring 30 is formed as a fully annular ring that is movably or slidably arranged relative to the casing 24 so as to rotate annularly relative thereto, as shown in FIG. 3A. The annular ring 30 may be formed as a single monolithic component, or may be formed in sections that are coupled together to form the fully annular ring 30. As can be seen in FIG. 3A and FIG. 3B, the annular ring 30 is arranged axially aft relative to the plurality of vanes 26, although a person skilled in the art will understand that, in other embodiments, the ring 30 may be arranged axially forward of the plurality of vanes 26. In some embodiments, the annular ring 30 is coaxial with the plurality of vanes 26, and more specifically, with the central axis 25.

Figure 3D:
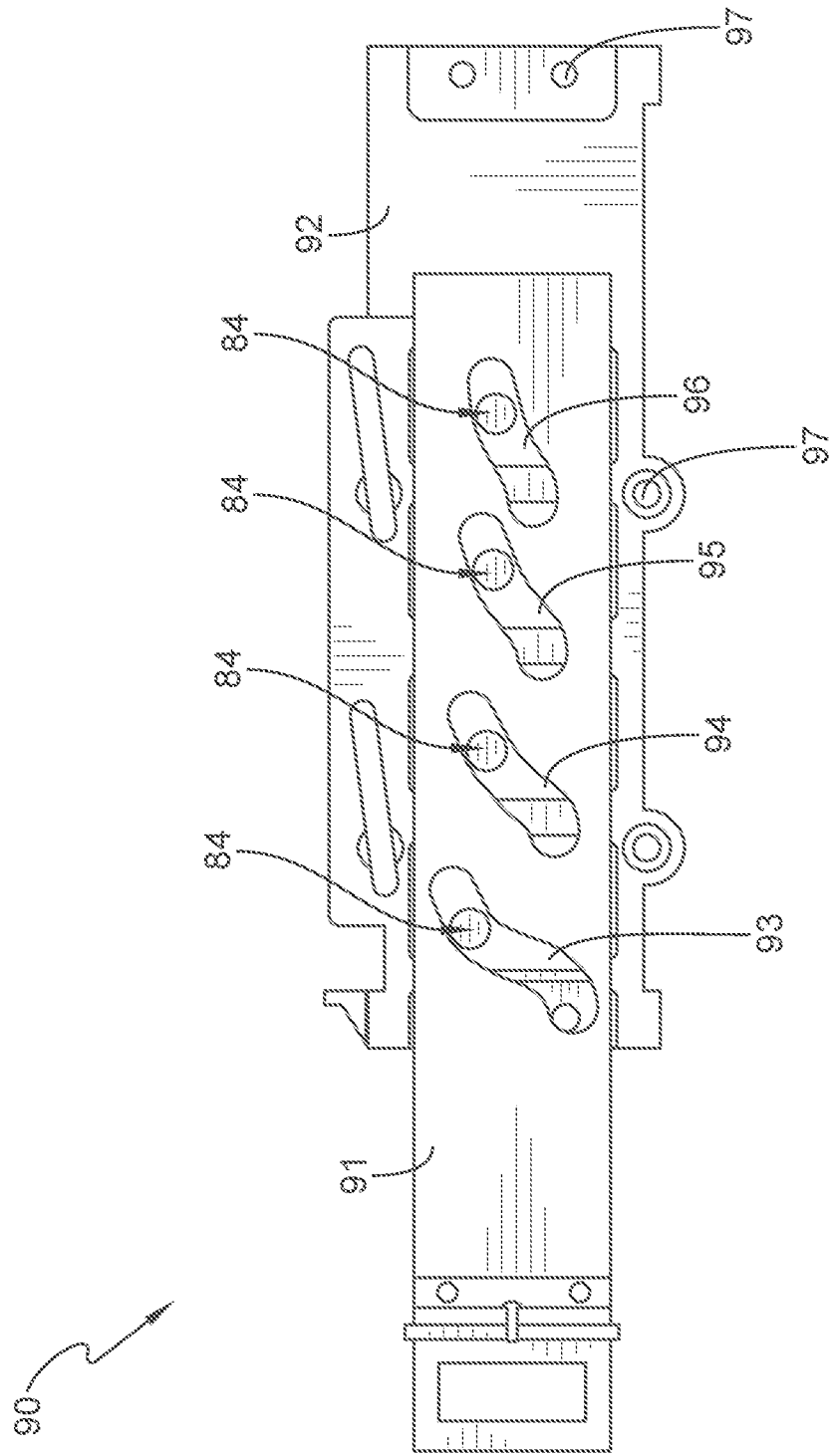
FIG. 3D is a top view of a cam plate configured to slidably engage the roller pin of the vane adjustment assembly of FIG. 2, showing that the cam plate is slidable in the axial direction relative to the casing so as to move the roller pins within slots formed in the cam plate.

As shown in FIG. 3D, a cam plate assembly 90 may be utilized to movably couple the vane adjustment assembly 36 to the casing 24. The cam plate assembly 90 includes a slidable cam plate 91 and a stationary support plate 92 fixedly coupled to the casing 24 at fastening points 97. The cam plate 91 may be slidably coupled to the support plate 92 either on a radially outer side of the support plate 92, as shown in FIG. 3D, or on a radially inner side of the support plate 92.

The cam plate 91 includes a plurality of slots 93, 94, 95, 96 which, when the cam plate 91 is arranged on the support plate 92, are aligned with the individual vane stages, for example, shown in FIG. 3A. The roller pin 80 of the vane adjustment assembly 36 of each vane stage is slidably arranged within each the corresponding slot 93, 94, 95, 96 via a roller pin head 84. The slots 93, 94, 95, 96 may be include the same or varying elongated shapes configured provide the same or differing movement paths for the roller pin heads 84 engage the roller pin head 84 of the vane adjustment assembly 36. In operation, the cam plate 91 can be moved in the axial direction relative to the stationary support plate 92, and thus relative to the casing 24, so as to move the roller pin heads 84 within the slots 93, 94, 95, 96 and thus along the specific paths defined by the slots 93, 94, 95, 96. The movement of the roller pin heads 84 will in turn move the annular ring 30 that is coupled to the roller pins 80 via the vane adjustment assembly 36.

With the cam plate 91, the roller pin 80 of the vane adjustment assembly 36 may be moved to a plurality of distinct roller pin positions that each correspond to distinct positions of the roller pin 80 relative to the casing 24. Moreover, due to the roller pin 80 being coupled to the annular ring 30 via the ring adjustment plate assembly 40, the movement of the roller pin 80 relative to the casing 24 via the cam plate 91 will also affect the positioning of the annular ring 30 relative to the casing 24.

In order to further fine-tune and adjust the positioning of the plurality of vanes 26 via the positioning of the annular ring 30, the vane adjustment assembly 36 further includes the ring adjustment plate assembly 40 shown in FIGS. 2 and 4A-10. Illustratively, the ring adjustment plate assembly 40 includes a main plate portion 42 and an axial plate portion 56 extending away from the main plate portion 42, the axial plate portion 56 having the roller pin 80 fixedly coupled thereto.

Figure 2:
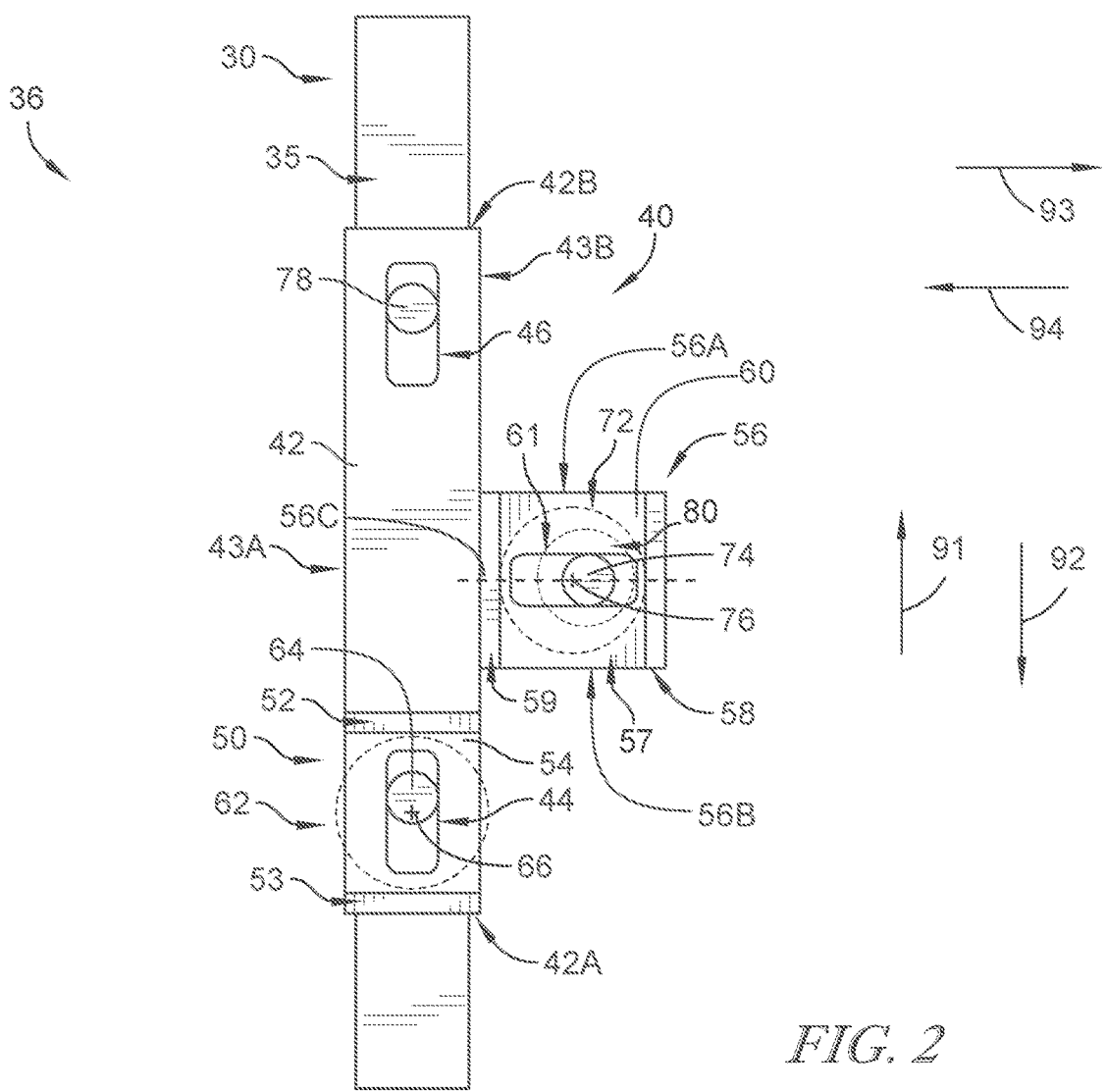
FIG. 2 is a top view of a vane adjustment assembly according to the present disclosure, showing that the assembly includes an annular ring and a ring adjustment plate assembly arranged on the annular ring, the ring adjustment plate assembly including two adjustment fasteners that have eccentric pins extending from heads of the fasteners, the heads shown in phantom and being arranged within walls of two adjustment regions of a main plate portion and an axial plate portion such that rotation of the adjustment fasteners allows for axial and circumferential adjustment of the ring adjustment plate assembly.
Figure 6B:
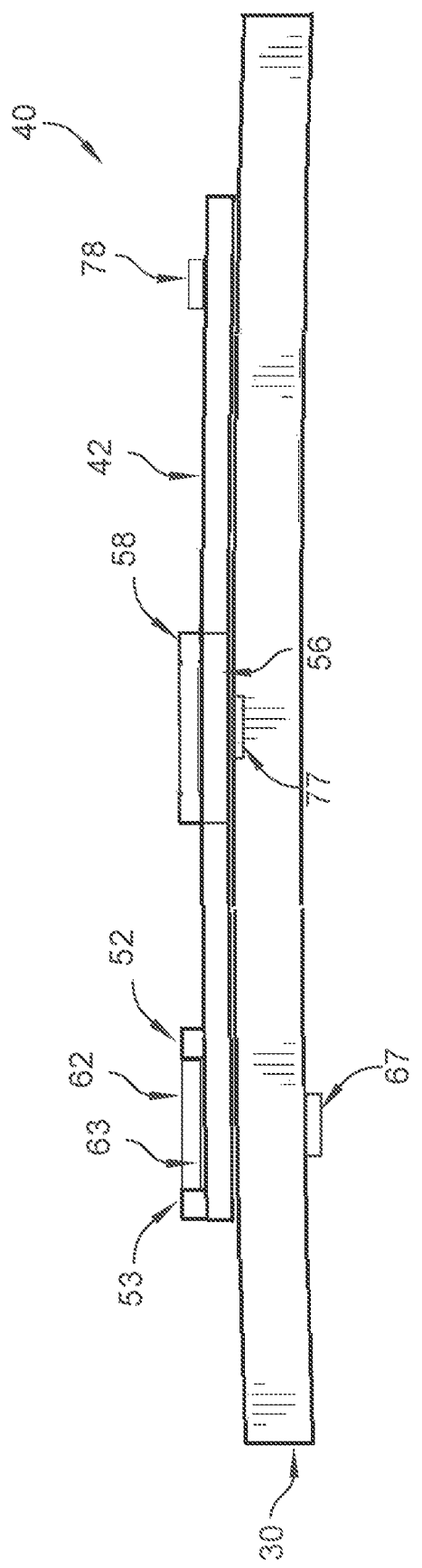
FIG. 6B is a rear view of the vane adjustment assembly of FIG. 2.
Figure 8:
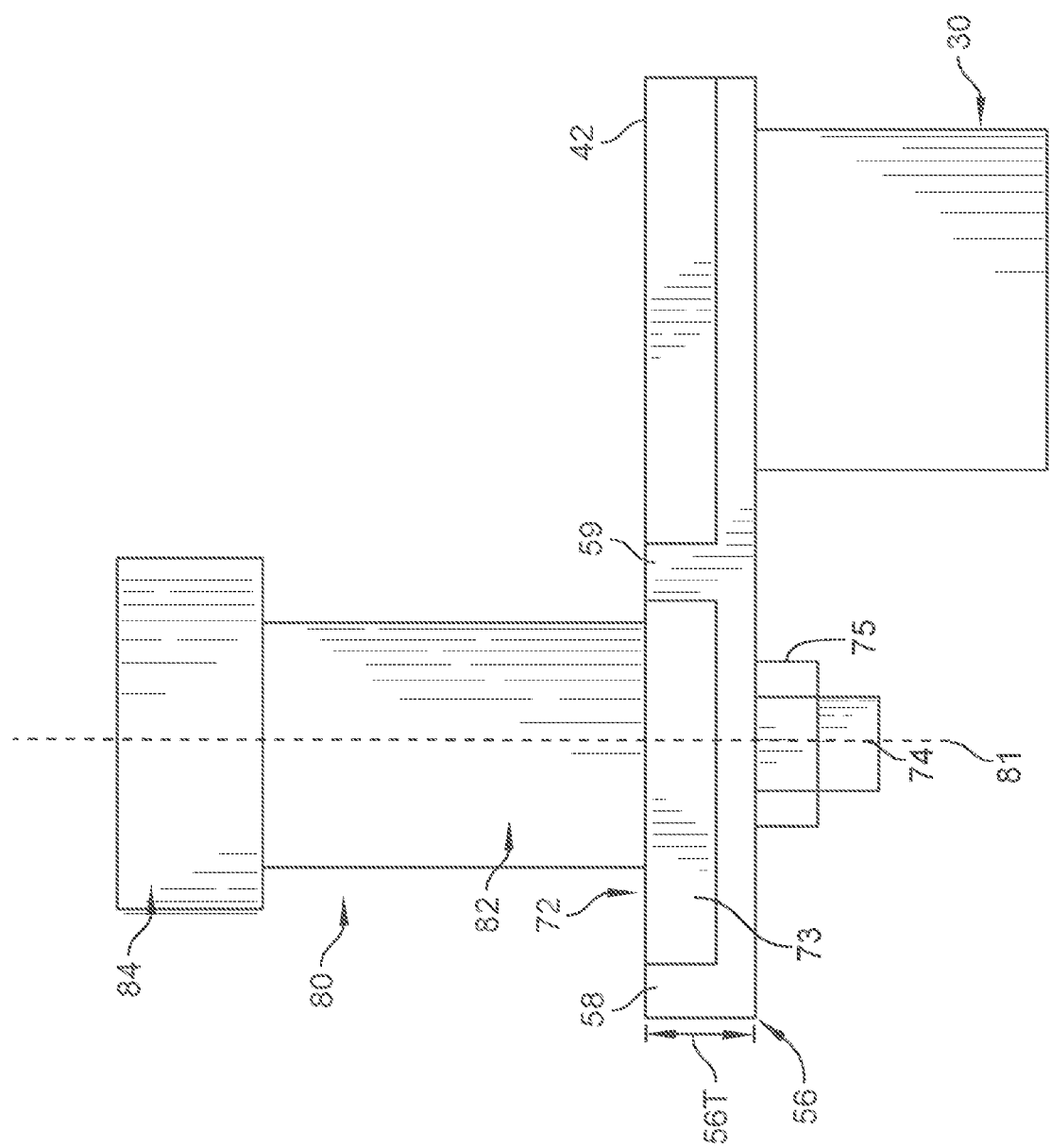
FIG. 8 is a side view of the vane adjustment assembly of FIG. 2 showing the roller pin arranged in an axially forward direction.

As can be seen in FIGS. 2, 6A, and 6B, the main plate portion 42 is formed as a substantially planar plate and is arranged on the radially facing surface 35 of the annular ring 30. In some embodiments, as can be seen in FIG. 6B, the plate is formed to substantially match the curvature of the annular ring 30, in particular of the radially facing surface 35 of the annular ring 30. A person skilled in the art will understand that the plate may be formed to not match the curvature of the annular ring 30, so long as the plate assembly 40 can be effectively coupled to the annular ring 30.

The main plate portion 42 includes at least one elongated opening 44 formed therethrough, as shown in FIG. 2. Illustratively, the main plate portion 42 includes two elongated openings 44, 46, also referred to as first and third elongated openings. The elongated openings 44, 46 are spaced apart from each other in the circumferential direction of the annular ring 30, or in the longitudinal direction of the main plate portion 42, and each extend generally parallel with the axial sides 43A, 43B, or longitudinal sides, of the main plate portion 42. As will be described in greater detail below, the first fastener pin 64 of the first adjustment fastener 62 extends through the first elongated opening 44 and couples the main plate portion 42 to the annular ring 30. The elongated shape of the opening 44 allows for circumferential movement of the first fastener pin 64 within the opening 44, and thus adjustment of the main plate portion 42 in the circumferential directions 91, 92. A simple fastener 78 may be arranged in the second elongated opening 46 so as to provide an additional mounting point of the main plate portion 42.

The main plate portion 42 includes a first adjustment region 50 within which the first elongated opening 44 is located, as shown in FIGS. 2 and 6A. Illustratively, the first adjustment region 50 is located at a circumferentially terminal end of the main plate portion 42, although in other embodiments, the first adjustment region 50 can be located at any location along the longitudinal extent of the main plate portion 42 (i.e. the circumferential extent). The first adjustment region 50 is defined between a first wall 52 and a second wall 53 that each extend radially away from the main plate portion 42. Each wall 52, 53 can also extend entirely from a first axial side 43A of the main plate portion 42 to a second axial side 43B of the main plate portion 42.

As can be seen in FIG. 6B, each wall 52, 53 extends radially away from the main plate portion 42 a distance great enough to contact at least a portion of the outer circumferential surface 63A of the first adjustment head 63 of the first adjustment fastener 62 and retain the first adjustment fastener 62 within the first adjustment region 50. For example, in the illustrative embodiment, each wall 52, 53 extends radially away from the main plate portion 42 a greater distance than the thickness of the first adjustment head 63, as measured in the radial direction of the annular ring 30. In some embodiments, each wall 52, 53 extends radially away from the main plate portion 42 a smaller distance than the thickness of the first adjustment head 63, but nevertheless retains the first adjustment fastener 62 within the first adjustment region 50.

Figure 4B:
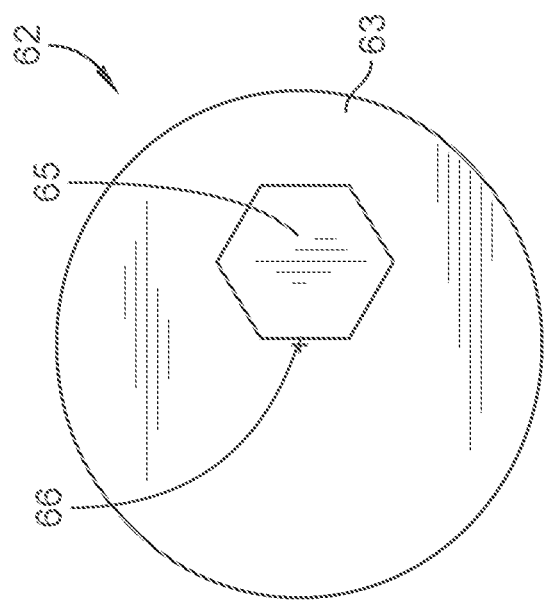
FIG. 4B is a top view of the adjustment fastener of FIG. 4A, showing the adjustment pin being offset from a center of the adjustment head.
Figure 4A:
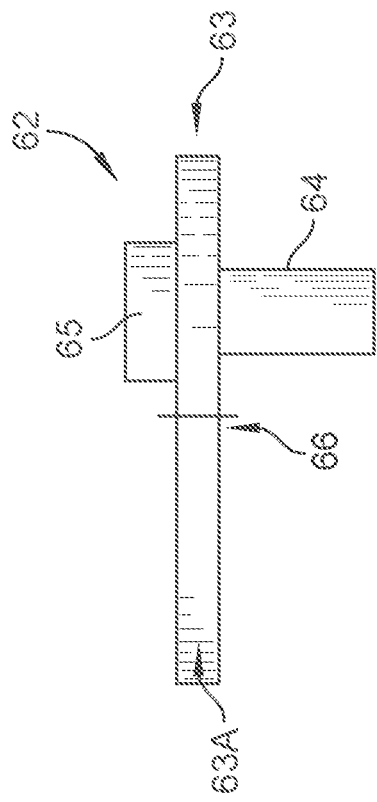
FIG. 4A is a side view of a first adjustment fastener of the vane adjustment assembly of FIG. 2 configured to be utilized in the first adjustment region of the main plate portion, showing the adjustment head having an adjustment pin depending downwardly from the adjustment head.

As shown in FIG. 2, an underside of the first adjustment head 63 of the first adjustment fastener 62 is configured to contact a top surface 54 of the first adjustment region 50 so as to couple the main plate portion 42 to the annular ring 30. In some embodiments, the first adjustment head 63 is formed as a flat circular plate, as shown in FIGS. 4A and 4B. A person skilled in the art will understand that the adjustment head 63 can be formed as other shapes so long as the head 63 can be arranged at different rotational positions between the walls 52, 53 of the first adjustment region 50. The circular head 63 advantageously provides an infinite number of rotational positions of the first adjustment head 63 between the walls 52, 53 to the extent such rotational positions are limited by the positioning of the fastener pin 64 within the elongated opening 44.

The first adjustment fastener 62 further includes a cylindrical fastener pin 64 depending downwardly from an underside of the adjustment head 63, as shown in FIG. 4A. The pin 64 may include threads so as to engage with corresponding threads formed in a nut 67 arranged at a terminal end of the pin 64, as shown in FIG. 6B. The fastener pin 64 is coupled to the adjustment head 63 eccentrically relative to a center 66 of the adjustment head 63, as shown in FIG. 4B. As will be described in detail below, the eccentricity of the fastener pin 64 allows for circumferential adjustment of the main plate portion 42 based on the rotational position of the adjustment head 63.

In some embodiments, the fastener pin 64 may extend through a hole in the adjustment head 63 and include a pin head 65 that secures the pin 64 to the adjustment head 63. The pin head 65 may be shaped to match a tooling configured to rotate the adjustment head 63 while the first adjustment fastener 62 is arranged in the first adjustment region 50, such as a hexagonal shape. In some embodiments, the fastener pin 64 may be rotatable relative to the first adjustment head 63 such that the tooling can tighten the pin 64 relative to the nut 67.

The first adjustment fastener 62 may be configured to be removably arranged within the elongated opening 44 in the first adjustment region 50 so as to allow for removal of the adjustment fastener 62 and reinsertion at a different rotational position. As such, a user has the option to adjust the rotational position of the first adjustment head 63 while it is arranged between the walls 52, 53 in the first adjustment region 50 by loosening the nut 67, or to adjust the rotational position of the first adjustment head 63 by removing and reinserting the first adjustment fastener 62 in the first elongated opening 44 of the first adjustment region 50.

In operation, the first adjustment fastener 62 is configured to be selectively arranged at a plurality of rotational positions within the first adjustment region 50 so as to selectively arrange the first fastening pin 64 at a plurality of circumferential positions relative to the first and second walls 52, 53. In other words, the eccentric arrangement of the fastener pin 64 relative to the adjustment head 63, as well as the contact of the adjustment head 63 with the walls 52, 53, causes the fastener pin 64 to be arranged at different positions within the elongated opening 44 each corresponding to a rotational position of the adjustment head 63. As a result of the positioning of the pin 64 in the elongated opening 44 and the position of the adjustment head 63 between the walls 52, 53, the main plate portion 42 can be positioned at a plurality of distinct circumferential positions each corresponding to a circumferential position of the first fastening pin 64 within the elongated opening 44. In other words, each rotational position of the first adjustment head 63 corresponds to at least one distinct circumferential position of the main plate portion 42.

For example, the first adjustment head 63 can be arranged at the rotational position between the walls 52, 53 shown in FIG. 2. In such a rotational position, the fastener pin 64 is located towards an upper end of the elongated opening 44 ("upper end" when viewing FIG. 2). As a result, the main plate portion 42 is adjusted in the second circumferential direction 92. As another non-limiting example, the first adjustment head 63 can be arranged at the rotational position between the walls 52, 53 shown in FIG. 9. In such a rotational position, the fastener pin 64 is located towards a lower end of the elongated opening 44 ("lower end" when viewing FIG. 9). As a result, the main plate portion 42 is adjusted in the first circumferential direction 92. As another non-limiting example, the first adjustment head 63 can be arranged at the rotational position between the walls 52, 53 shown in FIG. 10. In such a rotational position, the fastener pin 64 is located generally centrally in the elongated opening 44. As a result, the main plate portion 42 is not adjusted in either circumferential direction 91, 92.

In some embodiments, the roller pin 80 may be directly coupled to the main plate portion 42, and as a result, the roller pin 80 may be adjusted in the circumferential directions 91, 92 via movement of the main plate portion 42.

The ring adjustment plate assembly 40 may further include components to adjust an axial position of the roller pin 80, in particular an axial plate portion 56, as shown in FIGS. 2 and 6A-10. The axial plate portion 56 is formed as a substantially planar plate that extends axially away from a side surface of the main plate portion 42. In some embodiments, the axial length of the axial plate portion 56 may be larger than an axial width of the main plate portion 42 so as to accommodate a sufficiently sized second adjustment head 73 of the second adjustment fastener 72.

The axial plate portion 56 includes an elongated opening 61, also referred to as a second elongated opening, formed therethrough, as shown in FIG. 2. The elongated opening 61 extends generally parallel with the circumferential sides 56A, 56B, or longitudinal sides, of the axial plate portion 56. As will be described in greater detail below, the second fastener pin 74 of the second adjustment fastener 72 extends through the second elongated opening 61. The elongated shape of the opening 61 allows for circumferential movement of the second fastener pin 74 within the opening 61, and thus adjustment of the second adjustment fastener 72 and the roller pin 80 in the axial directions 93, 94.

Moreover, a thickness 56T of the axial plate portion 56, as measured in the radial direction relative to the annular ring 30, is thick enough so as to fixedly support the second fastener pin 74 and thus the second adjustment fastener 72 and the roller pin 80 coupled thereto. By way of a non-limiting example, the thickness 56T of the axial plate portion 56 is approximately one-fifth of the height of the roller pin 80, as measured in the radial direction. The flat, circular adjustment head 73 also rests on the flat top surface 60 of the second adjustment region 57, which further supports the adjustment fastener 72 and the roller pin 80.

The axial plate portion 56 includes the second adjustment region 57 within which the second elongated opening 61 is located, as shown in FIGS. 2 and 6A. Illustratively, the second adjustment region 61 is defined between a third wall 58 and a fourth wall 59 that each extend radially away from the axial plate portion 56. Each wall 58, 59 can also extend entirely from the first circumferential side 56A to the second circumferential side 56B. As can be seen in FIG. 6B, the walls 58, 59 (the fourth wall 59 is located behind the third wall 58 and thus not visible in FIG. 6B) extend radially away from the axial plate portion 56.

Similar to the walls 52, 53, the walls 58, 59 extend radially away from the axial plate portion 56 a distance great enough to contact at least a portion of the outer circumferential surface 73A of the second adjustment head 73 of the second adjustment fastener 72 and retain the second adjustment fastener 72 within the second adjustment region 57. For example, in the illustrative embodiment, each wall 58, 59 extends radially away from the axial plate portion 56 a greater distance than the thickness of the second adjustment head 73, as measured in the radial direction of the annular ring 30. In some embodiments, each wall 58, 59 extends radially away from the axial plate portion 56 a smaller distance than the thickness of the second adjustment head 73, but nevertheless retains the second adjustment fastener 72 within the second adjustment region 57.

Figure 5B:
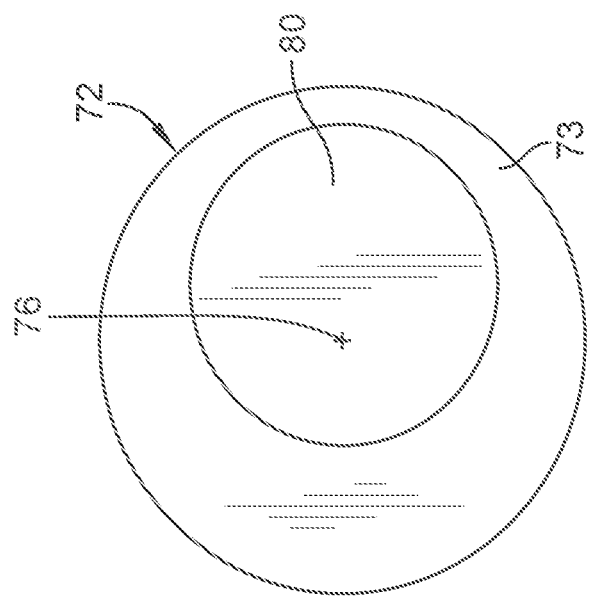
FIG. 5B is a top view of the adjustment fastener of FIG. 5A, showing the roller pin being offset from a center of the adjustment head.
Figure 5A:
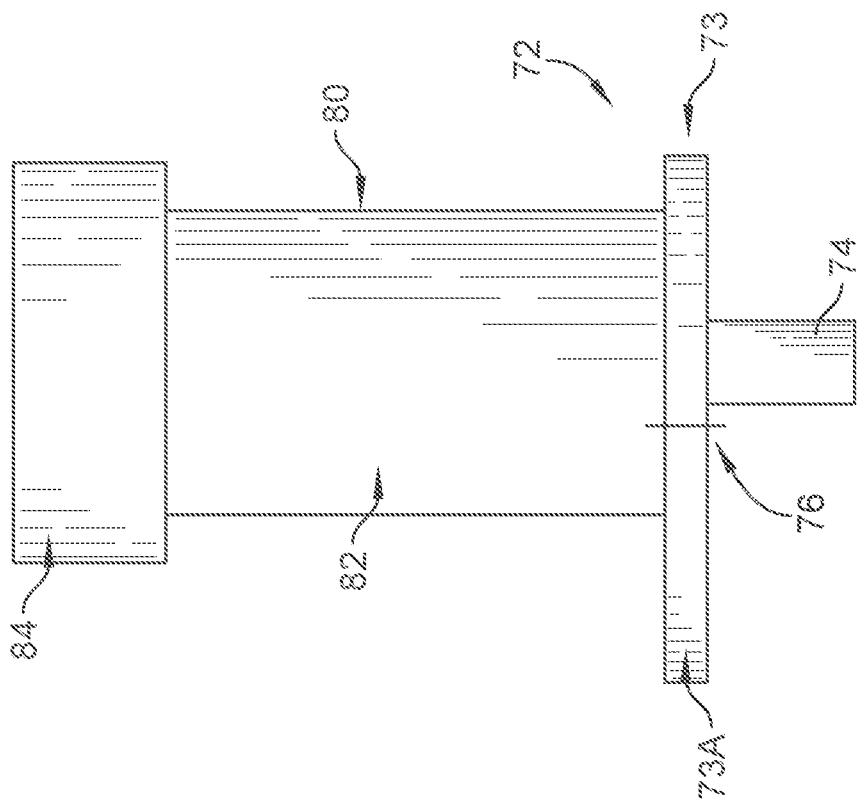
FIG. 5A is a side view of a second adjustment fastener of the vane adjustment assembly of FIG. 2 configured to be utilized in the second adjustment region of the axial plate portion, showing the adjustment head having an adjustment pin depending downwardly from the adjustment head and a roller pin coupled to a top of the adjustment head.

As shown in FIG. 2, an underside of the second adjustment head 73 of the second adjustment fastener 72 is configured to contact the top surface 60 of the second adjustment region 57. In some embodiments, the second adjustment head 73 is formed as a flat circular plate, as shown in FIGS. 5A and 5B. A person skilled in the art will understand that the adjustment head 73 can be formed as other shapes so long as the head 73 can be arranged at different rotational positions between the walls 58, 59 of the second adjustment region 57. The circular head 73 advantageously provides an infinite number of rotational positions of the first adjustment head 73 between the walls 58, 59 to the extent such rotational positions are limited by the positioning of the fastener pin 74 within the elongated opening 61.

The second adjustment fastener 72 further includes a cylindrical fastener pin 74 depending downwardly from an underside of the adjustment head 73, as shown in FIG. 5A. The pin 74 may include threads so as to engage with corresponding threads formed in a nut 77. The fastener pin 74 is coupled to the adjustment head 73 eccentrically relative to a center 76 of the adjustment head 73, as shown in FIG. 5B. As will be described in detail below, the eccentricity of the fastener pin 74 allows for axial adjustment of the roller pin 80 based on the rotational position of the adjustment head 73.

The roller pin 80 is coupled to the top surface of the second adjustment head 73 and extends radially outward away from the second adjustment head 73, as shown in FIGS. 5A, 5B, 7, and 8. The roller pin 80 may be formed as a cylinder 82 that extends upwardly and terminates at a roller pin head 84, which is located at a radially outer terminal end of the roller pin cylinder 82. As described above, the roller pin head 84 is configured to move within the slots 93, 94, 95, 96 formed in the cam plate 91. In some embodiments, the roller pin 80 is aligned with the fastener pin 74, as indicated by central axis 81 in FIGS. 7 and 8. In some embodiments, the roller pin 80 is offset from the fastener pin 74, as indicated in FIG. 10.

The second adjustment fastener 72 may be configured to be removably arranged within the elongated opening 61 in the second adjustment region 57 so as to allow for removal of the adjustment fastener 72 and reinsertion at a different rotational position. As such, a user has the option to adjust the rotational position of the second adjustment head 73 while it is arranged between the walls 58, 59 in the second adjustment region 57 and the fastener pin 74 is coupled to the axial plate portion 56 by loosening the nut 77 arranged on the terminal end of the pin 74. Alternatively, a user has another option to adjust the rotational position of the second adjustment head 73 by removing and reinserting the second adjustment fastener 72 in the second elongated opening 61 of the second adjustment region 57.

In operation, the second adjustment fastener 72 is configured to be selectively arranged at a plurality of rotational positions within the second adjustment region 57 so as to selectively arrange the second fastening pin 74 at a plurality of axial positions relative to the third and fourth walls 58, 59. In other words, the eccentric arrangement of the fastener pin 74 relative to the adjustment head 73, as well as the contact of the adjustment head 73 with the walls 58, 59, causes the fastener pin 74 to be arranged at different positions within the elongated opening 61 each corresponding to a rotational position of the adjustment head 73.

As a result of the positioning of the pin 74 in the elongated opening 61 and the position of the adjustment head 73 between the walls 58, 59, the roller pin 80 arranged on the second adjustment head 73 can be positioned at a plurality of distinct axial positions each corresponding to an axial position of the second fastening pin 74 within the elongated opening 61. In other words, each rotational position of the second adjustment head 73 corresponds to at least one distinct axial position of the axial plate portion 56. In embodiments in which the roller pin 80 is aligned with the fastener pin 74, as indicated by central axis 81 in FIGS. 7 and 8, the roller pin 80 can only move axially along the elongated opening 61 via the movement of the fastener pin 74. In embodiments in which the roller pin 80 is offset from the center of the fastener pin 74, as shown in FIG. 10, the roller pin 80 can be circumferentially adjusted as well, such as the position shown in FIG. 10.

By way of a non-limiting example, the second adjustment head 73 can be arranged at the rotational position between the walls 58, 59 shown in FIG. 2. In such a rotational position, the fastener pin 74 is located towards a right end of the elongated opening 61 ("right end" when viewing FIG. 2). As a result, the roller pin 80 is adjusted in the first axial direction 93, as shown in FIG. 6A. As another non-limiting example, the second adjustment head 73 can be arranged at the rotational position between the walls 58, 59 shown in FIG. 9. In such a rotational position, the fastener pin 74 is located towards a left end of the elongated opening 61 ("left end" when viewing FIG. 9). As a result, the roller pin 80 is adjusted in the second axial direction 94.

A method of adjusting a position of a plurality of variable vanes of a gas turbine engine according to a further aspect of the present disclosure includes arranging the plurality of vanes around to a central axis of the gas turbine engine, arranging an annular ring arranged radially outward of the central axis, and coupling the annular ring to the plurality of variable vanes. The method can further include arranging a main plate portion of a ring adjustment plate assembly on a radially outer surface of the annular ring, the main plate portion including a first adjustment region defined between a first wall extending radially outwardly away from a radially outer surface the main plate portion and a second wall spaced apart from the first wall and extending radially outwardly away from the radially outer surface the main plate portion, a first elongated opening being formed through the first adjustment region of the main plate portion.

The method can further include removably arranging a first adjustment fastener in the first adjustment region between the first and second walls, the first adjustment fastener including a first adjustment head that is circular and a first fastening pin eccentrically coupled to the first adjustment head, and removably coupling the first fastening pin of the first adjustment fastener to the annular ring. The first adjustment fastener can be configured to be selectively arranged at a plurality of rotational positions within the first adjustment region so as to selectively arrange the first fastening pin at a plurality of circumferential positions relative to the first and second walls such that the main plate portion is configured to be positioned at a plurality of distinct circumferential positions each corresponding to a circumferential position of the first fastening pin of the first adjustment fastener.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A vane adjustment assembly for a gas turbine engine, comprising
a plurality of vanes extending radially outward relative to a central axis of the gas turbine engine,
an annular ring arranged radially outward of the central axis and coupled to the plurality of variable vanes, and
a ring adjustment plate assembly including
a main plate portion arranged on a radially outer surface of the annular ring and including a first adjustment region defined between a first wall extending radially outwardly away from a radially outer surface of the main plate portion and a second wall spaced apart from the first wall and extending radially outwardly away from the radially outer surface of the main plate portion, a first elongated opening being formed through the first adjustment region of the main plate portion, and
a first adjustment fastener removably arranged in the first adjustment region between the first and second walls and including a first adjustment head that is circular and a first fastening pin eccentrically coupled to the first adjustment head and removably coupled to the annular ring,
wherein the first adjustment fastener is configured to be selectively arranged at a plurality of rotational positions within the first adjustment region so as to selectively arrange the first fastening pin at a plurality of circumferential positions relative to the first and second walls such that the main plate portion is configured to be positioned at a plurality of distinct circumferential positions each corresponding to a circumferential position of the first fastening pin of the first adjustment fastener.

2. The vane adjustment assembly of claim 1, wherein the first adjustment head contacts the radially outer surface of the main plate portion in the first adjustment region between the first and second walls, and wherein an outer circumferential surface of the first adjustment head contacts the first and second walls at all rotational positions of the plurality of rotational positions such that each rotational position of the first adjustment head corresponds to at least one distinct circumferential position of the main plate portion.

3. The vane adjustment assembly of claim 2, wherein the ring adjustment plate assembly further includes
an axial plate portion extending axially away from the main plate portion and including a second adjustment region defined between a third wall extending radially outwardly away from a radially outer surface the axial plate portion and a fourth wall spaced apart from the third wall and extending radially outwardly away from the radially outer surface the axial plate portion, a second elongated opening being formed through the second adjustment region of the axial plate portion,
a second adjustment fastener removably arranged in the second adjustment region between the third and fourth walls and including a second adjustment head that is circular and a second fastening pin eccentrically coupled to the second adjustment head, and
a roller pin fixedly coupled to the second adjustment head.

4. The vane adjustment assembly of claim 3, wherein the second adjustment fastener is configured to be selectively arranged at a plurality of rotational positions within the second adjustment region so as to selectively arrange the second fastening pin and the roller pin at a plurality of axial positions relative to the third and fourth walls.

5. The vane adjustment assembly of claim 3, wherein the second adjustment head contacts the radially outer surface of the axial plate portion in the second adjustment region between the third and fourth walls, and wherein an outer circumferential surface of the second adjustment head contacts the third and fourth walls at all rotational positions of the plurality of rotational positions such that each rotational position of the second adjustment head corresponds to at least one distinct circumferential position of the roller pin.

6. The vane adjustment assembly of claim 3, wherein the main plate portion further includes a third elongated opening spaced apart circumferentially from the first elongated opening, and wherein a third fastener pin is removably arranged therethrough and coupled to the annular ring.

7. The vane adjustment assembly of claim 3, wherein the axial plate portion is located centrally along a circumferential extent of the main plate portion.

8. The vane adjustment assembly of claim 7, wherein the main plate portion is curved to match a curvature of the radially outer surface of the annular ring.

9. The vane adjustment assembly of claim 2, wherein the first adjustment head is planar, wherein a bottom surface of the first adjustment head contacts the radially outer surface of the main plate portion, and wherein the first fastening pin extends downwardly from the bottom surface of the first adjustment head.

10. The vane adjustment assembly of claim 3, wherein the roller pin is selectively movably coupled to a casing of the gas turbine engine such that movement of the roller pin relative to the casing further adjusts a position of the annular ring relative to the casing, wherein the roller pin is selectively movably coupled to the casing via a cam plate that is slidably coupled to the casing and slidable relative to the casing, and wherein the cam plate includes at least one slot within which the roller pin is slidably arranged.

11. The vane adjustment assembly of claim 10, wherein sliding of the cam plate relative to the casing in an axial direction causes the roller pin to slidably move within the at least one slot and further adjusts the position of the annular ring relative to the casing, and wherein the roller pin includes a roller pin head configured to be slidably arranged within the at least one slot and engage with edges of the at least one slot.

12. A vane adjustment assembly for a gas turbine engine, comprising
an annular ring arranged radially outward of a central axis of the gas turbine engine and coupled to a plurality of variable vanes, and
a ring adjustment plate assembly including (i) a main plate portion arranged on the annular ring and including a first adjustment region defined between a first wall and a second wall spaced apart from the first wall, a first elongated opening being formed through the first adjustment region of the main plate portion, and (ii) a first adjustment fastener removably arranged in the first adjustment region and including a first adjustment head that is circular and a first fastening pin eccentrically coupled to the first adjustment head and removably coupled to the annular ring so as to locate the main plate portion radially between the first adjustment head and the annular ring, wherein the first adjustment fastener is configured to be selectively arranged at a plurality of rotational positions within the first adjustment region such that the main plate portion is configured to be positioned at a plurality of distinct circumferential positions each corresponding to a circumferential position of the first fastening pin relative to the first and second walls.

13. The vane adjustment assembly of claim 12, wherein the first adjustment head contacts a radially outer surface of the main plate portion in the first adjustment region between the first and second walls, and wherein an outer circumferential surface of the first adjustment head contacts the first and second walls at all rotational positions of the plurality of rotational positions such that each rotational position of the first adjustment head corresponds to at least one distinct circumferential position of the main plate portion.

14. The vane adjustment assembly of claim 13, wherein the ring adjustment plate assembly further includes an axial plate portion extending axially away from the main plate portion and including a second adjustment region defined between a third wall and a fourth wall spaced apart from the third wall, a second elongated opening being formed through the second adjustment region of the axial plate portion, a second adjustment fastener removably arranged in the second adjustment region between the third and fourth walls and including a second adjustment head that is circular and a second fastening pin eccentrically coupled to the second adjustment head, and a roller pin fixedly coupled to the second adjustment head.

15. The vane adjustment assembly of claim 14, wherein the second adjustment fastener is configured to be selectively arranged at a plurality of rotational positions within the second adjustment region so as to selectively arrange the second fastening pin and the roller pin at a plurality of axial positions relative to the third and fourth walls.

16. The vane adjustment assembly of claim 14, wherein the second adjustment head contacts the radially outer surface of the axial plate portion in the second adjustment region between the third and fourth walls, and wherein an outer circumferential surface of the second adjustment head contacts the third and fourth walls at all rotational positions of the plurality of rotational positions such that each rotational position of the second adjustment head corresponds to at least one distinct circumferential position of the roller pin.

17. The vane adjustment assembly of claim 14, wherein the main plate portion further includes a third elongated opening spaced apart circumferentially from the first elongated opening, and wherein a third fastener pin is removably arranged therethrough and coupled to the annular ring.

18. The vane adjustment assembly of claim 14, wherein the axial plate portion is located centrally along a circumferential extent of the main plate portion.

19. The vane adjustment assembly of claim 18, wherein the main plate portion is curved to match a curvature of the radially outer surface of the annular ring.

20. A method of adjusting a position of a plurality of variable vanes of a gas turbine engine, comprising arranging the plurality of vanes about a central axis of the gas turbine engine, arranging an annular ring arranged radially outward of the central axis, coupling the annular ring to the plurality of variable vanes, arranging a main plate portion of a ring adjustment plate assembly on a radially outer surface of the annular ring, the main plate portion including a first adjustment region defined between a first wall extending radially outwardly away from a radially outer surface of the main plate portion and a second wall spaced apart from the first wall and extending radially outwardly away from the radially outer surface of the main plate portion, a first elongated opening being formed through the first adjustment region of the main plate portion, removably arranging a first adjustment fastener in the first adjustment region between the first and second walls, the first adjustment fastener including a first adjustment head that is circular and a first fastening pin eccentrically coupled to the first adjustment head, and removably coupling the first fastening pin of the first adjustment fastener to the annular ring, wherein the first adjustment fastener is configured to be selectively arranged at a plurality of rotational positions within the first adjustment region so as to selectively arrange the first fastening pin at a plurality of circumferential positions relative to the first and second walls such that the main plate portion is configured to be positioned at a plurality of distinct circumferential positions each corresponding to a circumferential position of the first fastening pin of the first adjustment fastener.

* * * * *